United States Patent [19]
Park

[11] Patent Number: 5,995,478
[45] Date of Patent: *Nov. 30, 1999

[54] OPTICAL DISK PLAYER HAVING A PHASE ADJUSTING DEVICE FOR OPTICAL PICKUP

[75] Inventor: Byung-yeob Park, Suwon, Rep. of Korea

[73] Assignee: Samsung Electronics Co., Ltd., Kyungki-do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/786,903

[22] Filed: Jan. 23, 1997

[30] Foreign Application Priority Data

Jul. 25, 1996 [KR] Rep. of Korea .................. 96-30471

[51] Int. Cl.[6] .................................................. G11B 21/24
[52] U.S. Cl. ......................... 369/219; 369/215; 369/249
[58] Field of Search .................................... 369/215, 219, 369/249; 360/106, 107, 109

[56] References Cited

U.S. PATENT DOCUMENTS

| | | | |
|---|---|---|---|
| 4,947,481 | 8/1990 | Ikedo et al. | 369/215 |
| 5,111,088 | 5/1992 | Fujino | 369/219 |
| 5,124,974 | 6/1992 | Kato et al. | 369/215 |
| 5,768,248 | 6/1998 | Lee | 369/219 |

*Primary Examiner*—George J. Letscher
*Attorney, Agent, or Firm*—Sughrue, Mion, Zinn, Macpeak & Seas, PLLC

[57] ABSTRACT

An optical disk player is provided. The optical disk player includes a deck, a turntable for loading an optical disk thereon, an optical pickup, and guide shafts for guiding the transfer of the optical pickup. The optical disk player further has a horizontal phase adjusting device installed at an end portion of at least one of the guide shafts, and for moving the guide shaft in a horizontal direction to adjust phase errors of the optical pickup. Thus, phase error correction is facilitated.

4 Claims, 9 Drawing Sheets

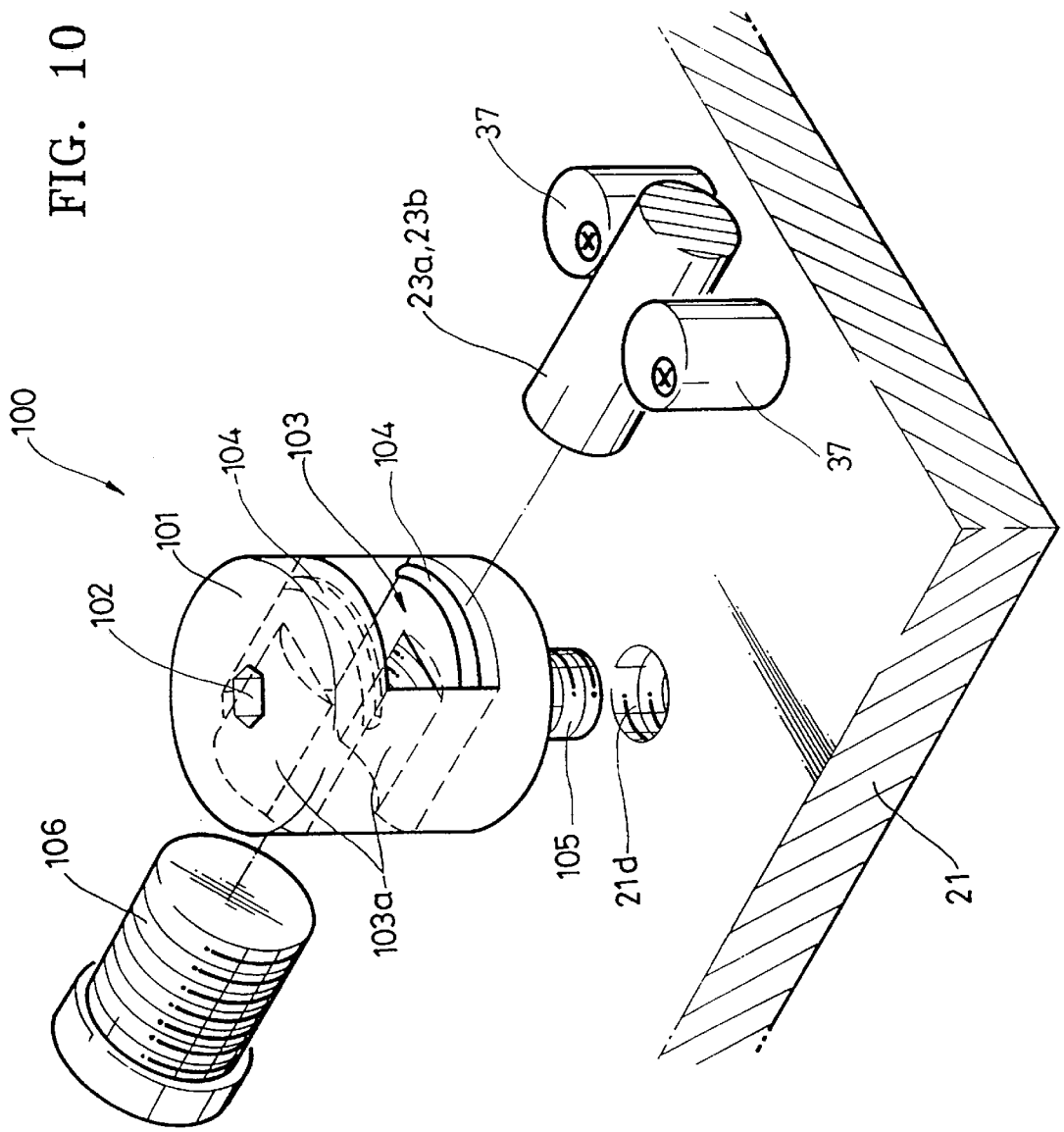

5,995,478

OPTICAL DISK PLAYER HAVING A PHASE ADJUSTING DEVICE FOR OPTICAL PICKUP

BACKGROUND OF THE INVENTION

The present invention relates to an optical disk player and, more particularly, to an optical disk player having a phase adjusting device for correcting a phase error.

An optical disk player records and reproduces audio and video data on and from a recording medium such as an optical disk including a compact disk (CD), a laser disk, and a digital video disk (DVD) using an optical pickup. The optical disk player is widely used as an auxiliary memory device for a computer and an audio and video reproducing device. The optical pickup of the optical disk player reciprocates over a rotating optical disk to record information thereon or reproduce the recorded information from pits formed thereon.

Referring to FIG. 1, an optical disk player 10 has a deck 11, a turntable 12 for loading an optical disk D thereon, a driving motor 19 for rotating the turntable 12, an optical pickup 15 for linearly reciprocating across the deck 11, guide shafts 13a and 13b for guiding the optical pickup 15, an optical pickup driving motor 16 for transferring the optical pickup 15, and a transmission unit for converting the rotation of the optical pickup driving motor 16 into a linear movement.

There may be many variations of the transmission unit. In the embodiment of FIG. 1, the transmission unit comprises a pinion gear 16a attached to a rotating shaft of the optical pickup driving motor 16, an idler gear 17 engaged with the pinion gear 16a, and a rack 15a formed on a side of the optical pickup 15, by which the optical pickup 15 can be moved linearly. Bushings 14 for supporting the guide shafts 13a and 13b are fixed on the deck 11. The optical pickup 15 is guided along the guide shafts 13a and 13b on the deck 11.

To densely record data and reproduce data in the optical disk player as constituted above, the relative position between the optical pickup 15 and the optical disk D should be kept uniformly while the optical pickup 15 is being transferred along the guide shafts 13a and 13b.

Generally, the transfer of the optical pickup 15 experiences three kinds of phase errors. When the optical pickup 15 is not transferred along the radial direction of the optical disk D, a horizontal phase error is produced. When the optical pickup 15 is not parallel to the plane of the optical disk D such that the optical pickup 15 is tilted in the tangential direction or the radial direction of the optical disk D, tilt phase errors of the tangential or radial directions occur, respectively. Since the optical pickup 15 is transferred along the guide shafts 13a and 13b supported on the deck 11 by the bushings 14, the installation direction and inclination of the guide shafts 13a and 13b directly influence the phase errors. That is, inaccurate installation of the guide shafts 13a and 13b deteriorates the quality of a signal recorded on or read from the optical disk D. Therefore, a phase adjusting device is required to adjust the installation of the shafts 13a and 13b on the deck 11.

In the general optical disk player of FIG. 1, no phase adjusting device is provided and the installation state of the optical pickup 15 is determined by the accuracy of the machining and assembly of the bushings 14 or the shafts 13a and 13b. Therefore, unless each part is precisely machined and parts are well assembled, the optical pickup 15 cannot be reliably transferred. In particular, even if the machining of parts and assembly management are performed within set tolerances, correction of the phase errors is difficult due to the accumulation of the errors.

SUMMARY OF THE INVENTION

To overcome the above problems, an object of the present invention is to provide an optical disk player having a phase adjusting device.

To achieve the above object, there is provided an optical disk player comprising a deck, a turntable for loading an optical disk thereon, an optical pickup operative to linearly reciprocate with respect to the deck, and a plurality of guide shafts for guiding the reciprocation of the optical pickup, the optical disk player further comprising: a horizontal phase adjusting device installed at an end portion of at least one of the guide shafts, and for moving the at least one of the guide shafts in a horizontal direction to adjust phase errors of the optical pickup.

The horizontal phase adjusting device has a body having a guiding portion which has a guiding slot for inserting the end portion of the at least one of the guide shafts therein, and a stopper for making contact with the end portion of the at least one of the guide shafts; an adjusting screw combined with one side of the guiding portion and protruding into the guiding slot to thereby contact one side surface of the at least one of the guide shafts; and a rod elastically supported on the other side of the guiding portion and protruding into the guiding slot to thereby contact an opposite side surface of the at least one of the guide shafts.

The horizontal phase adjusting device has a body having a guiding portion which has a guiding slot for inserting the end portion of the at least one of the guide shafts therein, and a stopper for making contact with the end portion of the at least one of the guide shafts; an elastic portion extended from one side of the guiding portion and for elastically supporting one side surface of the at least one of the guide shafts; a screw supporting portion extended from the one side of the guiding portion so as to face the elastic portion and having a screw threaded hole; and an adjusting screw combined with the screw threaded hole, an end portion of the adjusting screw contacting an opposite side surface of the at least one of the guide shafts.

The horizontal phase adjusting device further comprises fine adjustment cams which are rotatably fixed on the deck and contact opposite sides of the at least one of the guide shafts, and each of the fine adjustment cams has a circular section whose rotating center is eccentric.

The optical disk player further has at least one tilt phase adjusting device for adjusting a supported height of the end portion of the guide shaft with respect to a plane of the deck in order to correct a phase error of the optical pickup.

The tilt phase adjusting device comprises a body threadedly combined with the deck to move up and down perpendicularly to the plane of the deck, and having a circumferential groove formed in parallel to the plane of the deck around an outer circumferential surface of the body for supporting the end portion of the at least one of the guide shafts.

The tilt phase adjusting device has a body rotatably combined with the deck and having a circumferential groove inclined along an outer circumferential surface of the body for supporting the end portion of the at least one of the guide shafts.

The tilt phase adjusting device has a body threadedly combined with the deck to move up and down perpendicularly to the plane of the deck, and having an insertion hole for inserting the at least one of the guide shafts therein; and a stopper bolt threadedly combined with the body and which protrudes into the insertion hole to contact the end portion of the at least one of the guide shafts.

The stopper bolt is threadedly combined with the body in an inclined position so that the stopper bolt makes contact with the end portion of the at least one of guide shafts inserted into the insertion hole.

The stopper bolt is combined with screw-threaded surfaces formed in the insertion hole so that the stopper bolt makes contact with the end portion of the at least one of the guide shafts inserted into the insertion hole.

The tilt phase adjusting device further has fine adjustment cams which are rotatably fixed on the deck and contact opposite sides of the at least one of the guide shafts, wherein each of the fine adjustment cams has a circular section whose rotating center is eccentric.

BRIEF DESCRIPTION OF THE DRAWINGS

The above object and advantages of the present invention will become apparent by describing in detail preferred embodiments thereof with reference to the accompanying drawings, in which:

FIG. 10 is a perspective view of a further embodiment of the tilt phase adjusting device according to the present invention.

DETAILED DESCRIPTION OF THE PREFERRED EMBODIMENTS

Figure 1:
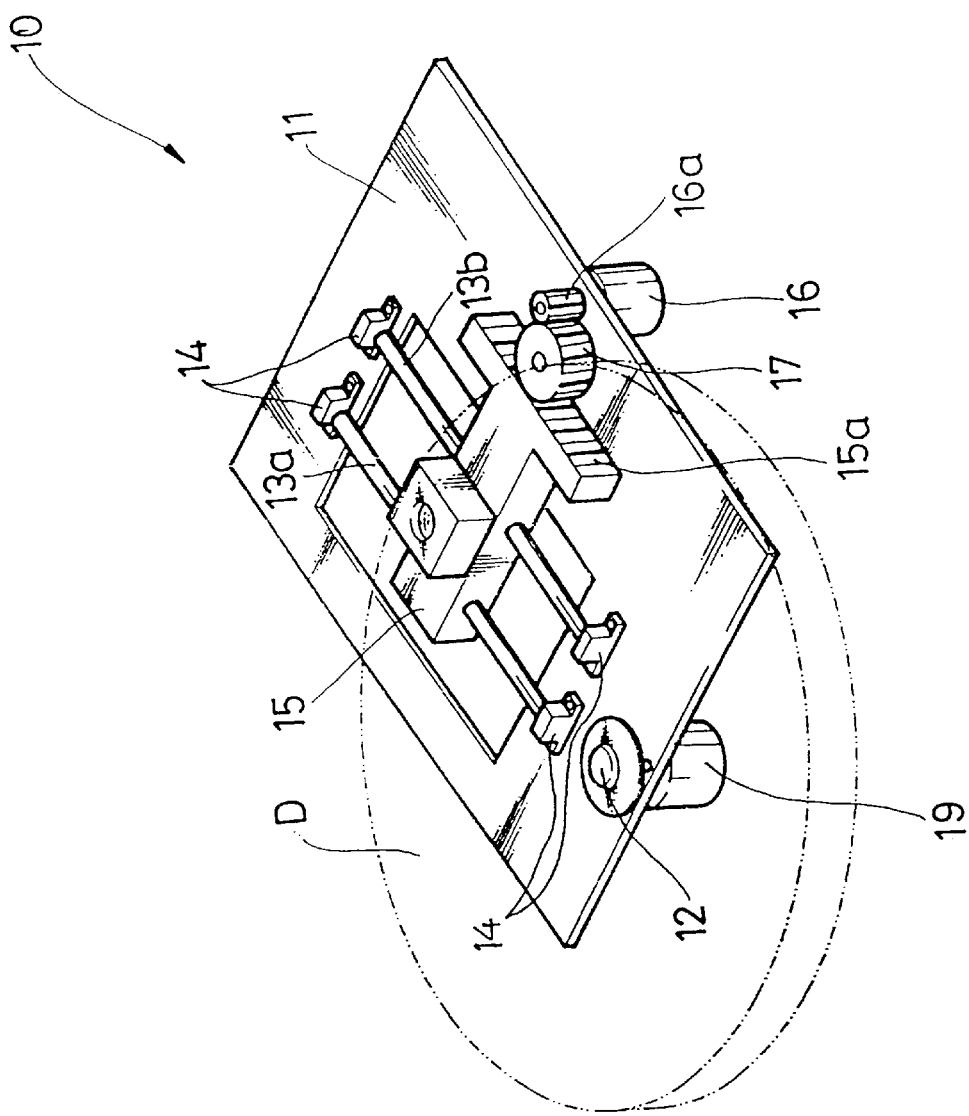
FIG. 1 is a perspective view of a general optical disk player.
Figure 2:
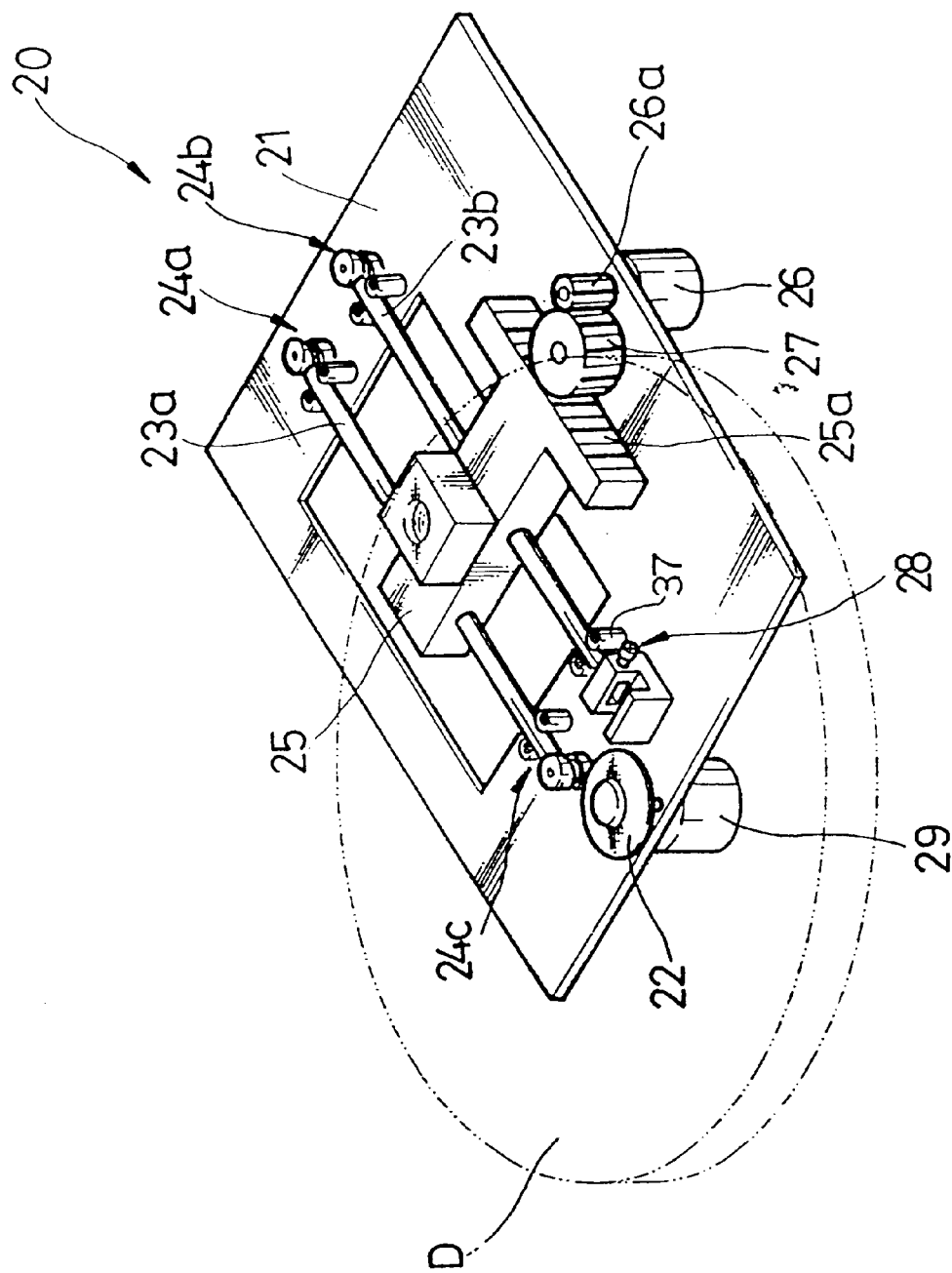
FIG. 2 is a perspective view of an optical disk player according to the present invention.

Referring to FIG. 2, an optical disk player 20 of the present invention includes: a deck 21; a turntable 22 for loading an optical disk D thereon; a driving motor 29 for rotating the turntable 22; an optical pickup 25 operative to linearly reciprocate on the deck 21; guide shafts 23a and 23b for guiding the transfer of the optical pickup 25; an optical pickup driving motor 26 for transferring the optical pickup 25; and a transmission unit for converting the rotation of the optical pickup driving motor 26 to a linear movement.

The transmission unit of FIG. 2 includes: a pinion gear 26a installed on an end portion of the shaft of the motor 26; an idler gear 27 engaged with the pinion gear 26a; and a rack 25a formed at one side of the optical pickup 25.

According to the characteristics of the present invention, the end portions of the guide shafts 23a and 23b are supported by tilt phase adjusting devices 24a, 24b, and 24c, and a horizontal phase adjusting device 28, for correcting phase errors of the optical pickup 25. As shown in FIG. 2, the tilt phase adjusting devices 24a, 24b, and 24c, and the horizontal phase adjusting device 28 are installed on the upper surface of the deck 21. Many variations of the tilt phase adjusting devices 24a, 24b, and 24c, and the horizontal phase adjusting device 28 are possible, as described later with respect to the following embodiments, and they may be selectively used.

Figure 3:
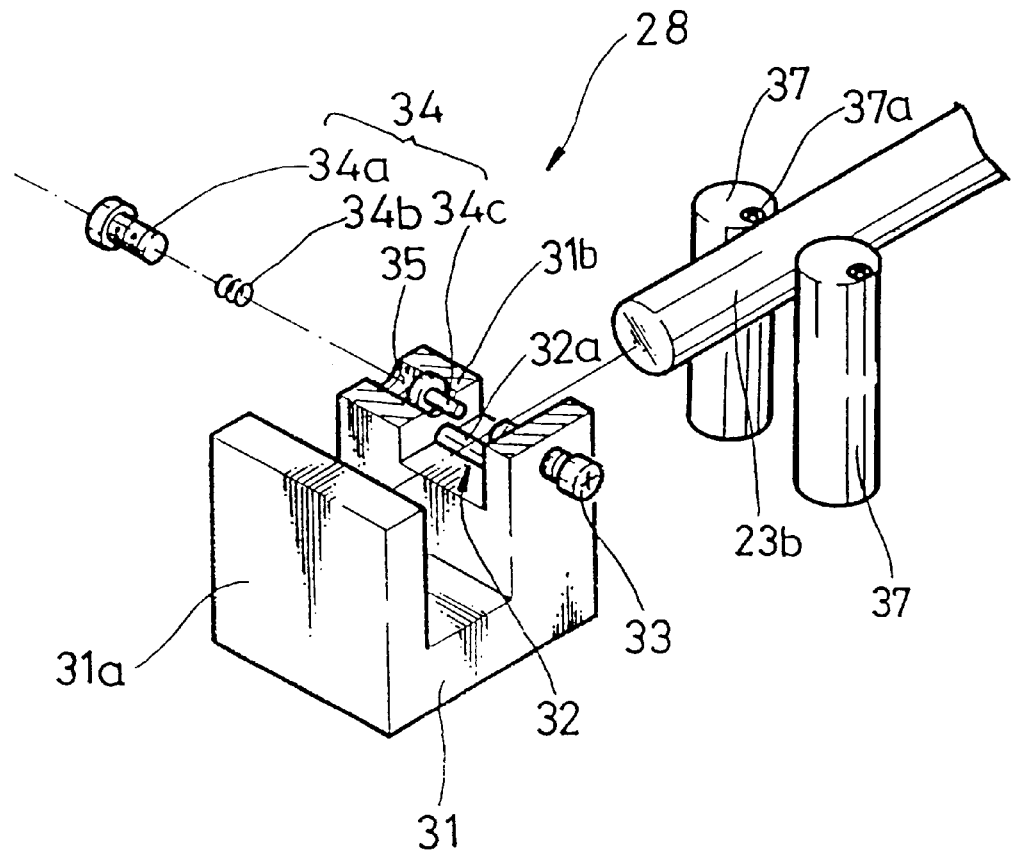
FIG. 3 is a partially sectional perspective view of an embodiment of a horizontal phase adjusting device according to the present invention.
Figure 4:
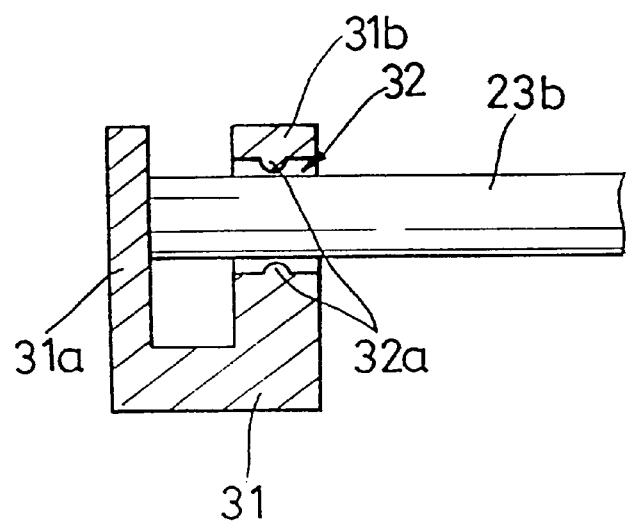
FIG. 4 is a side sectional view of FIG. 3.

FIGS. 3 and 4 are, respectively, a partial section perspective view and a side sectional view of an embodiment of the horizontal phase adjusting device 28 shown in FIG. 2.

Referring to the figures, a body 31 of the horizontal phase adjusting device 28 includes a stopper 31a and a guiding portion 31b. A guiding slot 32 is formed in the guiding portion 31b and the guide shaft 23b is inserted through the guiding slot 32. Since the width of the guiding slot 32 is larger than the diameter of the guide shaft 23b, some horizontal movement of the guide shaft 23b is allowed within a predetermined range and an end portion of the guide shaft 23b contacts the inner surface of the stopper 31a.

On the side surface of the guiding portion 31b defining the guiding slot 32 are installed an adjusting screw 33, and an elastic supporting portion 34 including a cap 34a, a spring 34b, and a rod 34c. The adjusting screw 33 is threadedly engaged with the guiding portion 31b, and an end portion thereof protrudes toward the guiding slot 32 to make contact with the side surface of the guide shaft 23b. Therefore, an operator can control the length of the adjusting screw portion protruding toward the guiding slot 32 by turning the adjusting screw 33 in a tightening direction or by turning the adjusting screw 33 in a loosening direction.

The elastic supporting portion 34 is positioned opposite to the adjusting screw 33 and in a hole 35 formed in the guiding portion 31b. The cap 34a is screwed into the hole 35, and the rod 34c is inserted into the hole 35 so as to make reciprocating movements. An end portion of the rod 34c protrudes toward the guiding slot 32 to contact the side surface of the guide shaft 23b. The spring 34b is disposed between the cap 34a and the rod 34c. Therefore, the guide shaft 23b is moved horizontally along the guiding slot 32 by tightening or loosening the adjusting screw 33, and kept at a predetermined horizontal position by the elastic force of the elastic supporting portion 34.

FIG. 4 is a side sectional view of FIG. 3, excluding fine adjustment cams 37. Referring to the figure, protrusions 32a are formed in the upper and lower portions of the guiding slot 32. As shown in FIG. 3, the protrusions 32a are extended along the width of the guiding slot 32. The protrusions 32a minimize the frictional force between the guide shaft 23b and the guiding portion 31b when the guide shaft 23b moves for phase adjustment. Referring to FIG. 3, the horizontal phase adjusting device 28 may selectively include the fine adjustment cams 37. That is, two fine adjustment cams 37 can be installed at opposite sides of the guide shaft 23b.

The fine adjustment cams 37 are cylindrical and have driver grooves 37a on the upper surface thereof and are rotatably fixed on the deck 21 (FIG. 2) with their rotating centers being eccentric. Therefore, the guide shaft 23b can be moved horizontally according to the rotation of the fine adjustment cams 37. Since the horizontal movement of the guide shaft 23b by the rotation of the fine adjustment cams 37 is fine, the fine adjustment cams 37 can be used for finely adjusting of a horizontal phase.

Figure 5:
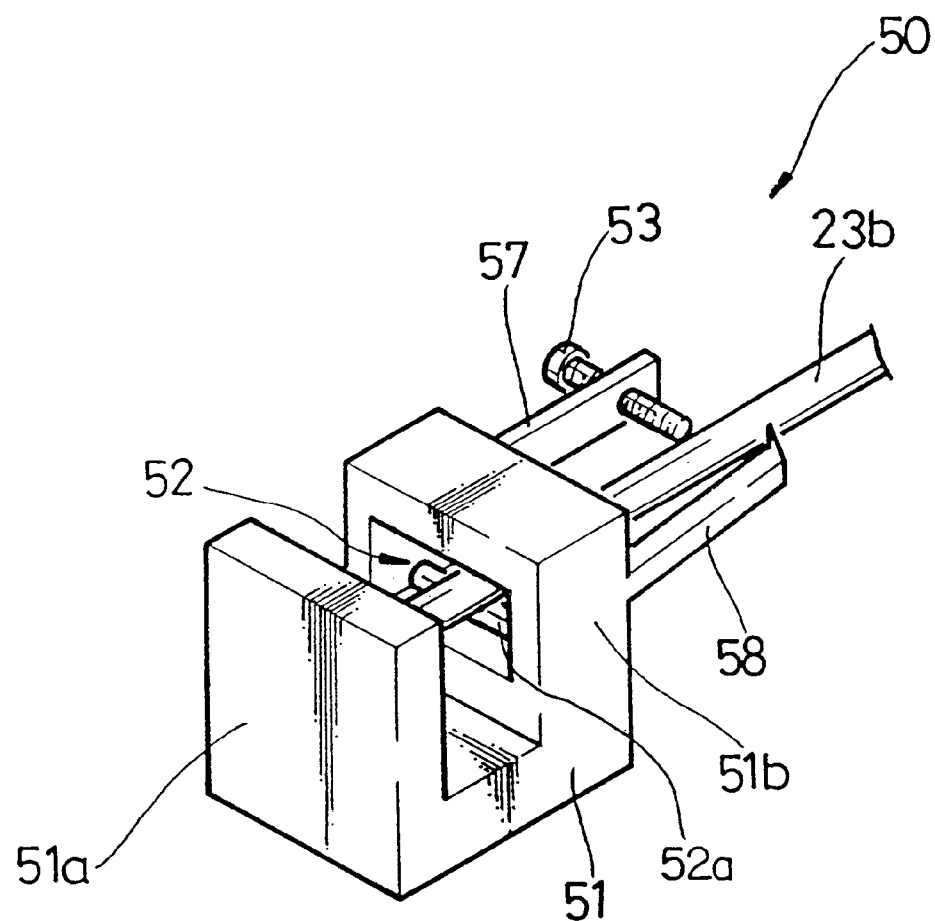
FIG. 5 is a perspective view of another embodiment of the horizontal phase adjusting device according to the present invention.

FIG. 5 illustrates another embodiment of the horizontal adjusting device. Referring to the figure, a horizontal phase adjusting device 50 includes a stopper 51a and a guiding portion 51b having a guiding slot 52. Protrusions 52a (only one of which is visible) are extended along the width of the guiding slot 52 in the upper and lower parts thereof, for supporting the guide shaft 23b penetrating the guiding slot 52.

A screw supporting portion 57 and an elastic portion 58 are extended from the side of the guiding portion 51. The screw supporting portion 57 includes an adjusting screw 53 threaded therein, and an end portion of the adjusting screw 53 protrudes to contact a side of the guide shaft 23b. The operator can adjust the position of the protruding end portion of the adjusting screw 53 by screwing in or unscrewing the adjusting screw 53. The elastic portion 58 is extended from a side of the guiding portion 51 toward a side of the guide shaft 23b so that an end portion of the elastic portion 58 applies elastic force in a horizontal direction to the guide shaft 23b. The guide shaft 23b is moved horizontally by unscrewing or screwing in the adjusting screw 53, and kept at a predetermined position by the elastic force of the elastic portion 58. The fine adjustment cams 37 not shown here but described with reference to FIG. 3 can also be used in the horizontal phase adjusting device 50 of the present embodiment.

FIGS. 6–10 are views of various embodiments of the phase adjusting devices 24a, 24b, and 24c shown in FIG. 2. In each of the above-mentioned figures, the description of each embodiment is given with respect to only one guide shaft.

Figure 6:
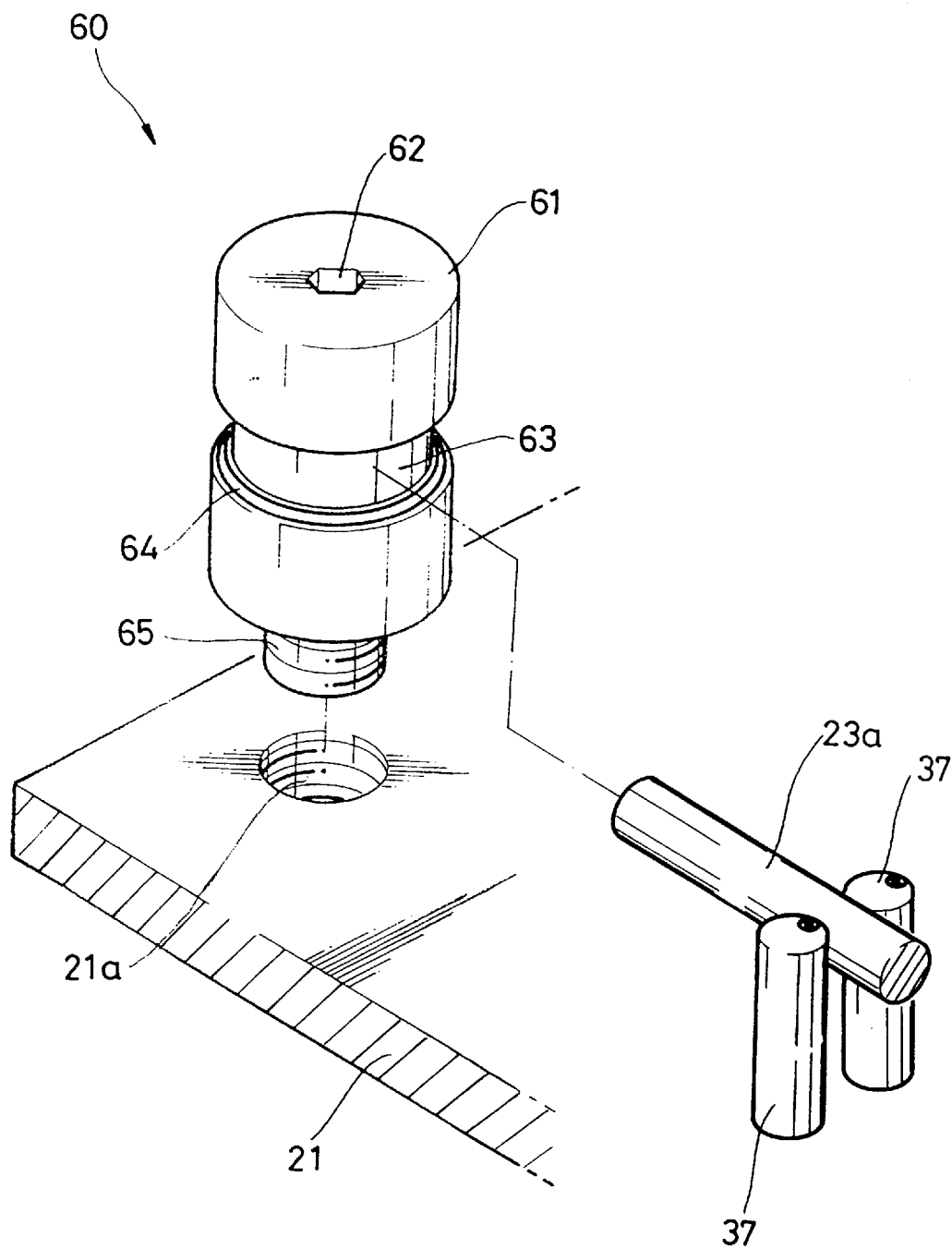
FIG. 6 is an exploded perspective view of an embodiment of a tilt phase adjusting device according to the present invention.

FIG. 6 is an exploded perspective view of an embodiment of the phase adjusting devices 24a, 24b, and 24c shown in FIG. 2.

Referring to the figure, a phase adjusting device 60 includes a cylindrical body 61. A screw threaded portion 65 is formed on the lower portion of the body 61, and threadedly combined with a screw threaded hole 21a formed in the deck 21. A driver groove 62 is formed on the upper surface of the body 61, and a circumferential groove 63 is formed around the outer circumferential surface of the body 61 so that an end of the guide shaft 23a is supported therein. Protrusions 64 are formed on the upper and lower rims of the circumferential groove 63, and the circumferential surface of the end portion of the guide shaft 23a contacts the protrusions 64 to be supported thereby (though only the protrusion 64 of the lower rim is visible in the figure, the protrusion of the upper rim is also similarly formed). The fine adjustment cams 37 previously described may optionally be installed at the opposite side surfaces of the guide shafts 23a and 23b (FIGS. 2 and 6).

When the operator rotates a driver tool (not shown) in the driver groove 62, the body 61 of the tilt phase adjusting device moves up and down perpendicularly with respect to the surface of the deck 21. The upward movement of the body 61 varies the height of the circumferential groove 63, thus varying the distance between the deck 21 and the guide shaft 23a which is supported by the circumferential groove 63. The protrusions 64 formed in the circumferential groove 63 minimize the frictional force between the guide shaft 23a and the body 61.

Figure 7:
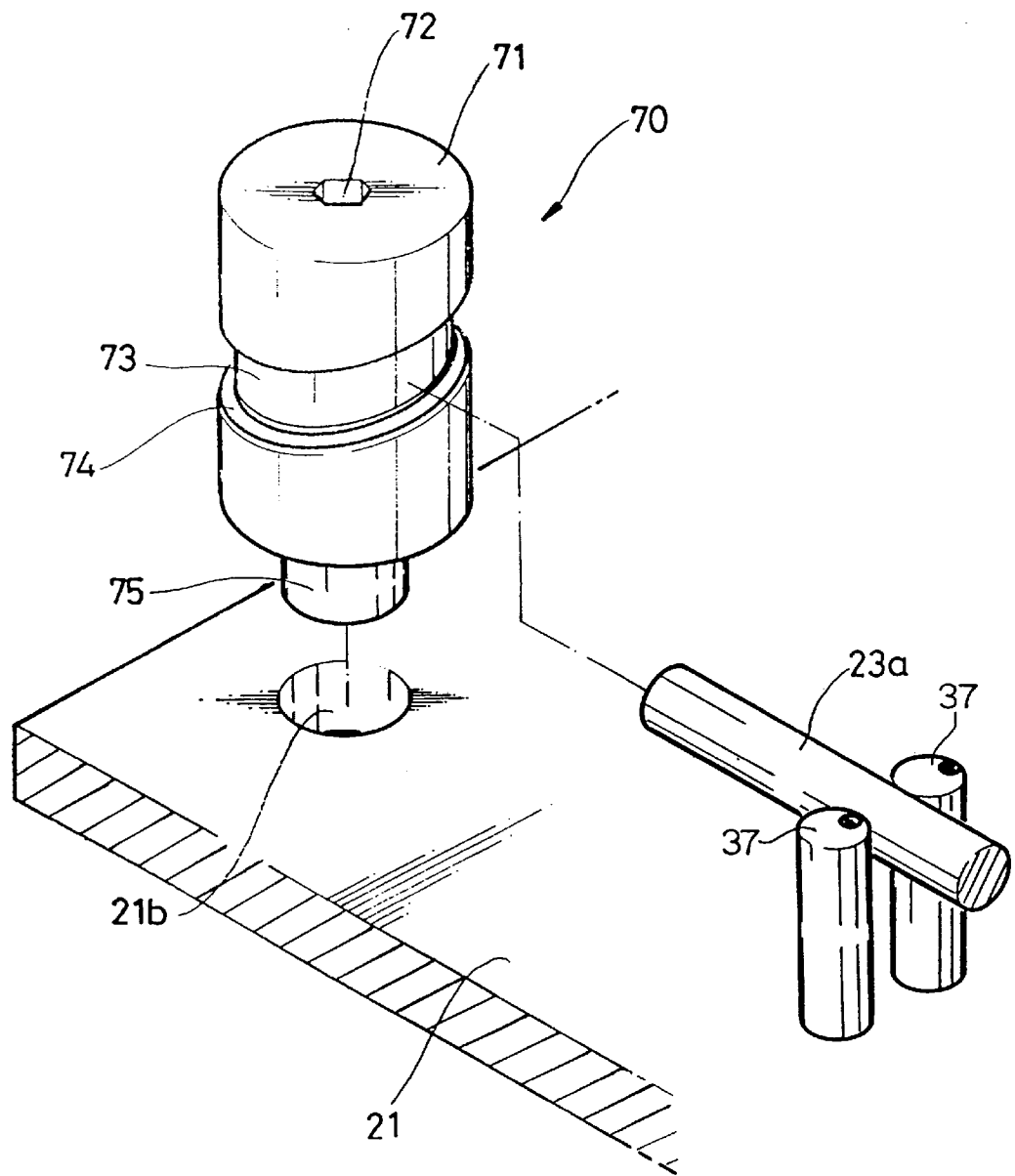
FIG. 7 is a perspective view of another embodiment of the tilt phase adjusting device according to the present invention.

FIG. 7 is an exploded perspective view of another embodiment of the tilt phase adjusting devices.

Referring to the figure, a tilt phase adjusting device 70 includes a cylindrical body 71 and fine adjustment cams 37 rotatably fixed on the deck 21. As described above, the fine adjustment cams 37 are optional. A combining portion 75 is formed on the lower portion of the body 71 and closely fitted into a hole 21b formed in the deck 21. The combining portion 75 fits in the hole 21b tight enough to retain the body 71 by friction but at the same time allow rotation of the body 71 if an operator exerts a rotational force to overcome the friction. A driver groove 72 is formed in the upper surface of the body 71, and a circumferential groove 73 is formed in the circumferential surface of the body 71. The circumferential groove 73 is inclined and the end portion of the guide shaft 23a is supported therein. Protrusions 74 are formed on the upper and lower rims of the circumferential groove 73, and the circumferential surface of the end portion of the guide shaft 23a is in contact with the protrusions 74 to be supported thereby (though only the protrusion 74 of the lower rim is visible in the figure, the protrusion of the upper rim is also similarly formed). The structure and function of the fine adjustment cams 37 have previously been described with reference to FIG. 3.

When the operator rotates a driver tool (not shown) placed in the driver groove 72, the tilt phase adjusting device body 71 rotates on the deck 21 and since the circumferential groove 73 is inclined along the outer circumferential surface of the body 71, the distance between the surface of the deck 21 and the guide shaft 23a can be adjusted according to the rotational position of the body 71. That is, if the body 71 is rotated in one direction, the guide shaft 23a moves up from the surface of the deck 21 along the inclined circumferential groove 73, while if the body 71 is rotated in the opposite direction, the guide shaft 23a moves down. The guide shaft 23a can be moved vertically and/or horizontally by such a distance variation and the operation of the fine adjustment cams 37.

Figure 8:
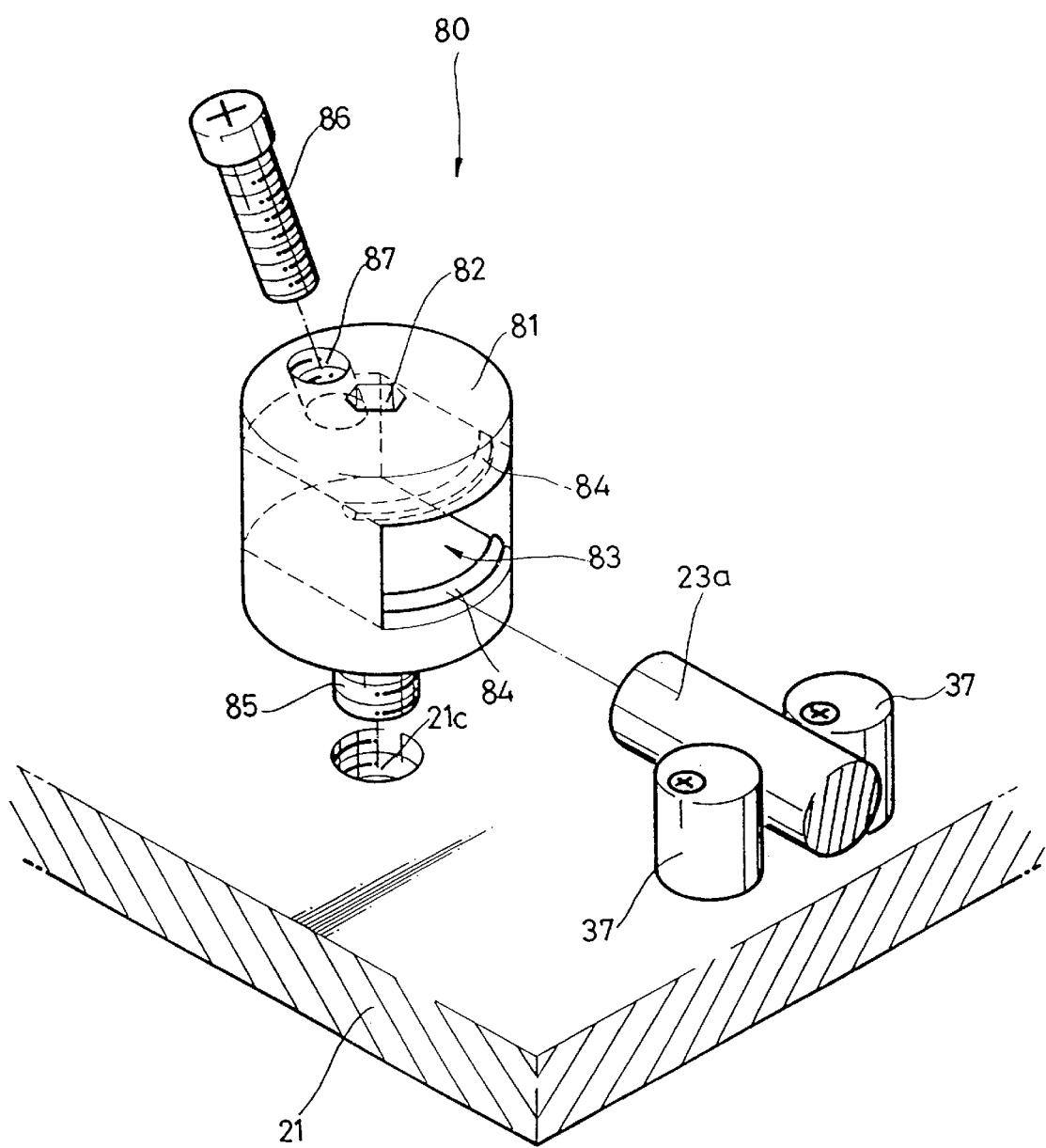
FIG. 8 is an exploded perspective view of still another embodiment of the tilt phase adjusting device according to the present invention.
Figure 9:
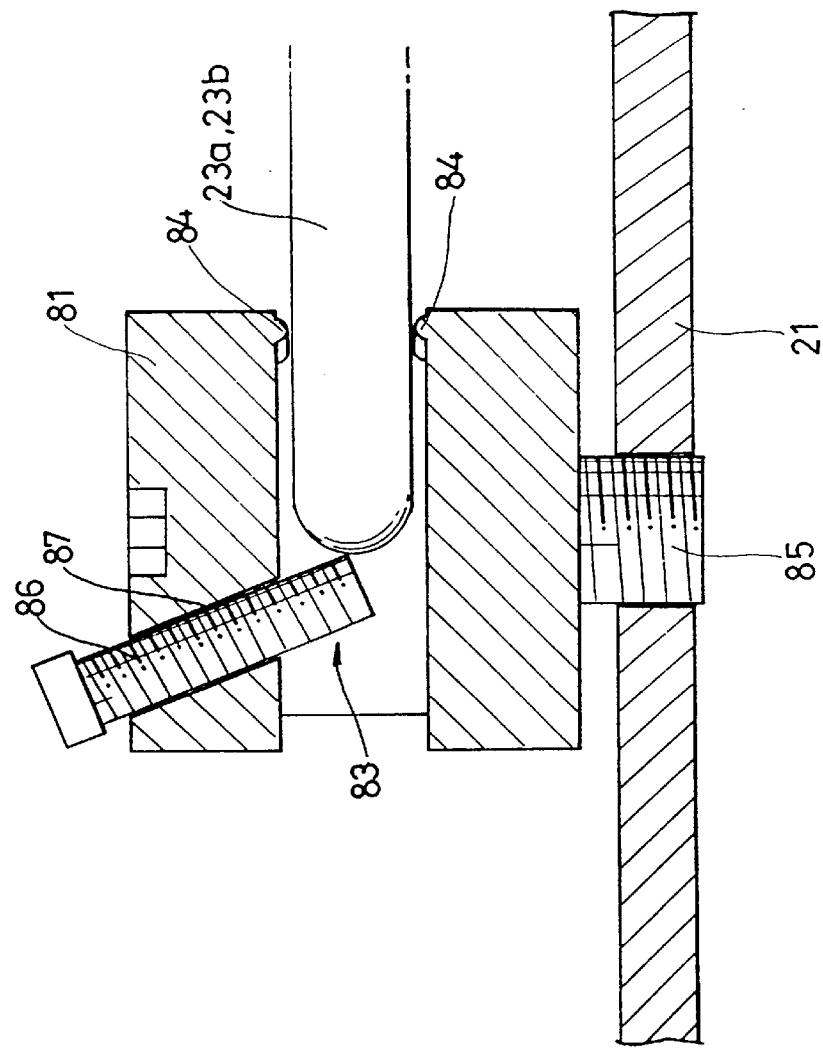
FIG. 9 is a side sectional view of FIG. 8.

FIGS. 8 and 9 are an exploded perspective view and a side sectional view, respectively, of still another embodiment of the tilt phase adjusting devices.

Referring to the figures, a tilt phase adjusting device 80 includes a cylindrical body 81. As described above, the fine adjustment cams 37 are optionally included. An insertion hole 83 is formed in the body 81 and a guide shaft 23a is inserted therein. A driver groove 82 is formed in the upper surface of the body 81, and a screw-threaded portion 85 is formed on the lower surface of the body 81. The screw-threaded portion 85 is inserted into a screw threaded hole 21c of the deck 21. A screw threaded hole 87 into which a stopper bolt 86 is threadedly inserted is formed in a portion of the upper surface of the body 81. The bottom of the screw threaded hole 87 is open to allow the stopper bolt 86 to enter the insertion hole 83. Protrusions 84 are formed on the upper and lower inner surfaces of the insertion hole 83.

The operator can rotate the body 81 by placing a driver tool (not shown) in the driver groove 82 and rotating it. The body 81 moves up and down perpendicularly to the surface of the deck 21 according to the direction of rotation thereof, thus varying the distance between the surface of the deck 21 and the guide shaft 23a inserted into the insertion hole 83. Of course, rough adjustment of the body 81 should be carried out prior to inserting the guide shaft 23a into the insertion hole 83. The insertion hole 83 is wide enough to prevent the end portion of the guide shaft 23a from slipping out even during the rotation of the body 81. The operation of the fine adjustment cams 37 installed at the side surfaces of the guide shaft 23a has previously been described with reference to FIG. 3. Therefore, the guide shaft 23a can move horizontally and/or vertically with respect to the surface of the deck 21.

As shown in FIG. 9, the stopper bolt 86 is inserted into the screw threaded hole 87 which is inclined to communicate with the insertion hole 83 and the end portion thereof contacts the end portion of the guide shaft 23a. Since the stopper bolt 86 is inserted in an inclined position, the depth to which the end portion of the guide shaft 23a is inserted into the insertion hole 83 can be varied by adjusting the stopper bolt 86. That is, an error generated along the length of the guide shaft 23a can be corrected. For example, when the guide shaft 23a is short it can be used with a long stopper bolt 86 and vice versa. Furthermore, an error generated along the length of the guide shaft 23a during assembly thereof can be controlled.

FIG. 10 is an exploded perspective view of a further embodiment of the tilt phase adjusting devices.

Referring to the figure, a tilt phase adjusting device 100 is provided with a cylindrical body 101 and the fine adjustment cams 37. As described above, inclusion of the fine adjustment cams 37 is optional. An insertion hole 103 into which the end portion of the guide shaft 23a is inserted is formed in the cylindrical body 101, and a screw threaded portion 105 is formed on the lower surface of the body 101 to be inserted into a screw threaded hole 21d of the deck 21. A driver groove 102 is formed in the upper surface of the cylindrical body 101, and the operator can rotate the body 101 by rotating a driver tool (not shown) inserted in the driver groove 102. Due to the screw portion 105, the body 101 can move up or down perpendicularly to the surface of the deck 21 according to the direction of rotation thereof, thereby varying the position of the insertion hole 103 and thus the distance between the surface of the deck 21 and the guide shaft 23a inserted therein. Again, rough adjustment of the body 101 should be carried out prior to inserting the guide shaft 23a into the insertion hole 103. The insertion hole 103 is wide enough to prevent the end portion of the guide shaft 23a inserted therein from slipping out even with the rotation of the body 101.

Screw-threaded surfaces 103a are formed in portions of the insertion hole 103 to be engaged with a stopper bolt 106. The stopper bolt 106 is inserted into the opposite side of the insertion hole 103 from that in which the shaft 23a is inserted and makes contact with the end portion of the guide shaft 23a. The operator can control the depth to which the end portion of the guide shaft 23a is inserted in the insertion hole 103 by rotating the stopper bolt 106. The guide shaft 23a is supported by protrusions 104 formed on the upper and lower inner surfaces of the insertion hole 103. The fine adjustment cams 37 have previously been described with reference to FIG. 3.

Now, the operation of the horizontal phase adjusting devices 28 and 50, and the tilt phase adjusting devices 60, 70, 80, and 100 will be described.

The horizontal phase adjusting devices 28 and 50, or the tilt phase adjusting devices 60, 70, 80, and 100 may be selectively used.

For example, the horizontal phase adjusting device 28 of FIG. 3 is installed at an end portion of the guide shaft 23b, and the tilt phase adjusting device 60 of FIG. 6 is installed at the other end portion of the guide shaft 23b and both end portions of the guide shaft 23a (FIG. 2). A phase error occurring during the horizontal movement of the optical pickup 25 of FIG. 2 is corrected using the horizontal phase adjusting device 28, and fine adjustment thereof can be accomplished using the fine adjustment cams 37 included in the horizontal phase adjusting device 28. Tilt phase errors in the tangential and radial directions of the optical disk D are corrected by rotating the body 61 of the tilt: phase adjusting device 60 (FIG. 6), thus adjusting the distances between the surface of the deck 21 and both end portions of the guide shaft 23a. The fine adjustment cams 37 included in the tilt phase adjusting device 60 can be used for fine adjustment of horizontal errors.

In another example, one of the tilt phase adjusting devices 60, 70, 80, and 100 shown in FIGS. 6 through 10 is selected to support the end portions of the guide shafts 23a and 23b, without the horizontal phase adjusting device 28 of FIG. 2.

Here, horizontal phase errors are corrected by the fine adjustment cams 37, and other errors are corrected by controlling the tilt phase adjusting devices 60, 70, 80, and 100, thus controlling the distance between the surface of the deck 21 and the guide shafts 23a and 23b.

The optical disk player according to the present invention facilitates adjustment of phase errors through the addition of a horizontal phase adjusting device or a tilt phase adjusting device during device manufacture or repair. Such an adjustment function prevents the direct impact of phase errors possibly caused due to poor quality machining or assembly of parts, thus resulting in improved signal recording and reproduction.

While the present invention has been illustrated and described with reference to the above specific embodiments, these are exemplary applications. Thus, it is clearly understood that further modifications and alternations will occur to those skilled in the art, and this should be borne in mind when construing the scope of the claims which follow.

What is claimed is:

1. An optical disk player comprising a deck, a turntable for loading an optical disk thereon, an optical pickup operative to lineraly reciprocate with respect to said deck, and a plurality of guide shafts for guiding the reciprocation of said optical pickup, said optical disk player further comprising:

a horizontal phase adjusting device installed on said deck and abutting against an end portion of at least one of said guide shafts, said horizontal phase adjusting device being operative to move said at least one of said guide shafts in a horizontal direction to adjust phase errors of said optical pickup, wherein said horizontal phase adjusting device comprises:
 a body having a guiding portion which has a guiding slot for inserting the end portion of said at least one of said guide shafts therein, and a stopper for making contact with the end portion of said at least one of said guide shafts;
 an adjusting screw combined with one side of said guiding portion and protruding into said guiding slot to thereby contact one side surface of said at least one of said guide shafts; and
 a rod elastically supported on another side of said guiding portion and protruding into said guiding slot to thereby contact an opposite side surface of said at least one of said guide shafts.

2. The optical disk player as claimed in claim 1, wherein protrusions are formed in upper and lower portions of said guiding slot along the width thereof and which contact upper and bottom surfaces of said at least one of said guide shafts, respectively.

3. The optical disk player as claimed in claim 1, wherein said horizontal phase adjusting device further comprises fine adjustment cams which are rotatably fixed on said deck and contact opposite sides of said at least one of said guide shafts, and each of said fine adjustment cams has a circular section whose rotating center is eccentric.

4. An optical disk player comprising a deck, a turntable for loading an optical disk thereon, an optical pickup operative to linearly reciprocate with respect to said deck, and a plurality of guide shafts for guiding the reciprocation of said optical pickup, said optical disk player further comprising:

a horizontal phase adjusting device installed at an end portion of at least one of said guide shafts, and for moving said at least one of said guide shafts in a horizontal direction to adjust phase errors of said optical pickup, wherein said horizontal phase adjusting device comprises:

a body having a guiding portion which has a guiding slot for inserting the end portion of said at least one of said guide shafts therein, and a stopper for making contact with the end portion of said at least one of said guide shafts;

an adjusting screw combined with one side of said guide portion and protruding into said guiding slot to thereby contact one side surface of said at least one of said guide shafts; and a rod elastically supported on another side of said guiding portion and protruding into said guiding slot to thereby contact an opposite side surface of said at least one of said guide shafts.

* * * * *